(12) United States Patent
Yokoyama

(10) Patent No.: US 10,192,296 B2
(45) Date of Patent: Jan. 29, 2019

(54) IMAGE PICKUP APPARATUS, CAMERA SYSTEM, AND IMAGE PROCESSING APPARATUS THAT RESTORE AN IMAGE WITH A FILTER CORRESPONDING TO AN IMAGE PICKUP PLANE POSITION

(71) Applicant: CANON KABUSHIKI KAISHA, Tokyo (JP)

(72) Inventor: Takayoshi Yokoyama, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 25 days.

(21) Appl. No.: 14/825,420

(22) Filed: Aug. 13, 2015

(65) Prior Publication Data

US 2016/0065924 A1 Mar. 3, 2016

(30) Foreign Application Priority Data

Sep. 2, 2014 (JP) .................................. 2014-178186

(51) Int. Cl.
*G06T 5/20* (2006.01)
*H04N 5/232* (2006.01)
*H04N 5/357* (2011.01)
*G06T 5/00* (2006.01)

(52) U.S. Cl.
CPC ............ *G06T 5/20* (2013.01); *G06T 5/003* (2013.01); *H04N 5/23212* (2013.01); *H04N 5/3572* (2013.01)

(58) Field of Classification Search
CPC .. H04N 5/232; H04N 5/23212; H04N 5/3572; H04N 9/646; G06T 5/20; G06T 5/003; G06T 5/001; G06T 2207/20182; G03B 13/36
See application file for complete search history.

(56) References Cited

U.S. PATENT DOCUMENTS

| 7,079,179 | B2 * | 7/2006 | Sumitomo | ............. | H04N 5/217 |
| | | | | | 348/222.1 |
| 8,830,378 | B2 * | 9/2014 | Asakura | ............. | H04N 5/23212 |
| | | | | | 348/222.1 |
| 2005/0012846 | A1 * | 1/2005 | Shinohara | .......... | H04N 5/23212 |
| | | | | | 348/345 |

(Continued)

FOREIGN PATENT DOCUMENTS

| JP | 2005024895 A | 1/2005 |
| JP | 2010087672 A | 4/2010 |
| JP | 2011205231 A | 10/2011 |

OTHER PUBLICATIONS

Office Action issued in Japanese Appln. No. 2014-178186 dated May 1, 2018. English translation provided.

*Primary Examiner* — Luong T Nguyen
(74) *Attorney, Agent, or Firm* — Rossi, Kimms & McDowell LLP

(57) ABSTRACT

An image pickup apparatus includes a controller configured to adjust a position of an image pickup plane from a position of a focal plane by correcting amounts based on image pickup environmental information, an image pickup element configured to capture an image on an adjusted position of the image pickup plane, and an image processor configured to restore the captured image utilizing an image restoration filter corresponding to the position of the image pickup plane.

10 Claims, 8 Drawing Sheets

(56) References Cited

U.S. PATENT DOCUMENTS

| | | | | |
|---|---|---|---|---|
| 2007/0076308 A1* | 4/2007 | Hirose | ............... | G02B 7/028 |
| | | | | 359/783 |
| 2008/0152334 A1* | 6/2008 | Choi | ............... | G03B 13/32 |
| | | | | 396/97 |
| 2008/0159644 A1* | 7/2008 | Kelly | ............... | H04N 5/217 |
| | | | | 382/261 |
| 2010/0079615 A1* | 4/2010 | Hatakeyama | ............... | G06T 5/20 |
| | | | | 348/223.1 |
| 2011/0193997 A1* | 8/2011 | Hatakeyama | ............... | H04N 5/3572 |
| | | | | 348/241 |
| 2011/0242373 A1* | 10/2011 | Inoue | ............... | H04N 5/3572 |
| | | | | 348/242 |
| 2012/0236173 A1* | 9/2012 | Telek | ............... | G03B 17/08 |
| | | | | 348/223.1 |
| 2014/0036084 A1* | 2/2014 | Lu | ............... | B60R 11/04 |
| | | | | 348/148 |
| 2014/0168383 A1* | 6/2014 | Murakami | ............... | G02B 7/36 |
| | | | | 348/47 |

\* cited by examiner

IMAGE PICKUP APPARATUS, CAMERA SYSTEM, AND IMAGE PROCESSING APPARATUS THAT RESTORE AN IMAGE WITH A FILTER CORRESPONDING TO AN IMAGE PICKUP PLANE POSITION

BACKGROUND OF THE INVENTION

Field of the Invention

The disclosure relates to an image pickup apparatus, a camera system, and an image processing apparatus.

Description of the Related Art

Various correction processing methods, which correct a captured image by treating an image as a signal value, have been proposed with digitalization of information. When an object photographed by a digital camera is imaged, an acquired image degrades not a little especially by aberrations of an image pickup optical system.

Image blurring components include spherical aberration, coma aberration, curvature of field, and astigmatism of an optical system. The presence of the image blurring components caused by these types of aberrations means that when a light beam emitted from one point does not suffer from any aberration or diffraction, the light beam fails to converge to another point, being minutely spread around the another point. Such a minutely-spread distribution is represented by point spread function (PSF). Image blurring components is not out of focus, but deteriorations by influence of aberrations of the above optical system when being in focus. In addition, color bleeding in a color image, which is caused by axial chromatic aberration, a spherical aberration in color, and coma aberration in a color of the optical system, is generated due to a blur in each wavelength of light. Moreover, a color shift in a lateral direction caused by transverse chromatic aberration of the optical system is a position blur or a phase blur due to an image magnification in each wavelength of light.

An optical transfer function (OTF) obtained by the Fourier transform of the PSF is frequency component information on an aberration and represented by a complex number. The absolute value of the OTF, i.e., an amplitude component, is referred to as a "modulation transfer function" (MTF), and a phase component is referred to as a "phase transfer function" (PTF), respectively. The MTF and the PTF are frequency characteristics of the amplitude component and the phase component of image deterioration caused by an aberration, respectively. These are represented by the following expression with the phase component being defined as a phase angle. Symbols Re (OTF) and Im (OTF) represent a real part and a imaginary part of the OTF, respectively.

$$PTF = \tan^{-1}(Im(OTF)/Re(OTF))$$

Because the optical transfer function OTF of the image pickup optical system deteriorates the amplitude component and the phase component of an image, each point of an object asymmetrically blurs as coma aberration in the deteriorated image.

Transverse chromatic aberration occurs in a situation in which an imaging position is shifted due to a difference in the formation ratio depending on each light wavelength and the formed image is obtained as an RGB color component, for example, according to spectral characteristics of the image pickup apparatus. This means that imaging positions of R, G, and B components are shifted to each other, leading to an imaging position shift in each color component depending on a wavelength, that is, a spread of an image due to a phase shift. Thus, transverse chromatic aberration is not just the color shift being a parallel shift exactly, but the color shift is described with the same mean as transverse chromatic aberration unless otherwise noted.

A method of correcting a deterioration of the MTF and the PTF utilizing information of the OTF of the image pickup optical system is known. This method is generally called image restoration or image reconstruction, and the method of convoluting an image restoration filter with reverse characteristics of an optical transfer function OTF with respect to an input image is known as one example of the image restoration methods. Japanese Patent Laid-open No. 2011-205231 discloses an invention to accelerate an image restoration process. Because the image restoration process performs a convolution process relative to an image restoration filter, which is a two-dimensional filter, a size of the image restoration filter influences processing speed. Accordingly, when off-axis aberrations, such as curvature of field, are large, generating the image restoration filter of a state where a center of the image is in-focus expands the image restoration filter at the circumferential part of the image, and slows the process. Thus, Japanese Patent Laid-open No. 2011-205231 moves a focusing surface to minify the image restoration filter over the entire image height, and thus decreases the image restoration filter over the entire image to accelerate the image restoration process.

Conventional image restoration filters for the image restoration process, which are generated on the assumption that an image pickup environment is fixed, fails to correspond to a change of the image pickup environment, such as atmospheric temperature and humidity. Thus, in an optical system including an imaging lens, such as a projection lens, arranged near a high heat source, such as a lamp, or a plastic lens whose optical characteristics enormously change by atmospheric temperature and humidity, optical characteristics enormously change by the image pickup environment, and thus the image restoration process cannot be performed appropriately. Japanese Patent Laid-open No. 2011-205231 fails to disclose a method regarding reduction of image deteriorations caused by the image pickup environment.

SUMMARY OF THE INVENTION

The disclosure provides an image pickup apparatus, a camera system, and an image processing apparatus that can reduce image deterioration by environmental changes during shooting.

An image pickup apparatus as one aspect of the disclosure a controller configured to adjust a position of an image pickup plane from a position of a focal plane by correcting amounts based on image pickup environmental information, an image pickup element configured to capture an image on an adjusted position of the image pickup plane, and an image processor configured to restore the image utilizing an image restoration filter corresponding to the position of the imaging plane.

A camera system as another aspect of the disclosure includes an image pickup optical system, a controller configured to adjust a position of an image pickup plane from a position of a focal plane by correcting amounts based on image pickup environmental information, an image pickup element configured to capture an image on an adjusted position of the imaging plane, and an image processor configured to restore the image utilizing an image restoration filter corresponding to the position of the image pickup plane.

An image processing apparatus as another aspect of the disclosure includes an acquirer configured to acquire an image, image pickup environmental information, and an image restoration filter corresponding to the image pickup environmental information, and an image processor configured to restore the image utilizing the image restoration filter.

Further features of the present invention will become apparent from the following description of exemplary embodiments with reference to the attached drawings.

DESCRIPTION OF THE PREFERRED EMBODIMENTS

Figure 1:
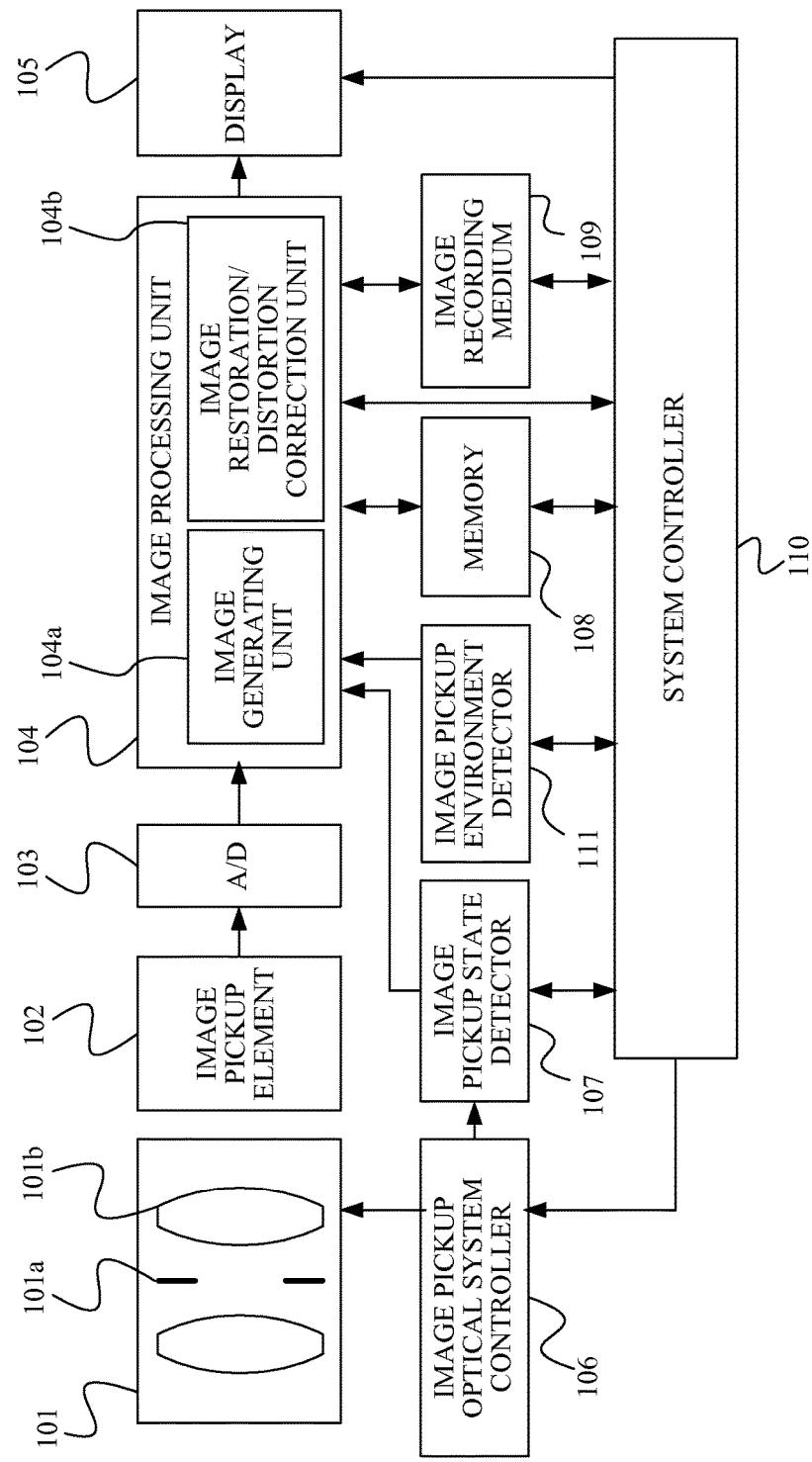
FIG. 1 is a block diagram illustrating a configuration of a camera system in a first embodiment.

Exemplary embodiments of the present invention will be described below with reference to the accompanied drawings. In each of the drawings, the same elements will be denoted by the same reference numerals and the duplicate descriptions thereof will be omitted.

First of all, the definitions of terms and an image restoration process (image processing method) which are used in this embodiment will be described. The image processing method described in this embodiment is used as appropriate in each embodiment described later.

[Input Image]

An input image is a digital image (captured image) obtained by receiving light with an image pickup element via an image pickup optical system, and is deteriorated by an optical transfer function (OTF) depending on an aberration of the image pickup optical system including a lens and various optical filters. The image pickup optical system can be configured to use not only a lens, but also a mirror (reflection surface) having a curvature.

An output image has, for example, information on an RGB color component. In addition to this color component, a color space, such as lightness, hue, and chroma which are expressed by LCH, lightness expressed by YCbCr, and color-difference signal, can be selected to use as color components. As alternative types of color spaces, XYZ, Lab, Yuv, and JCh can also be used. Furthermore, a color temperature may be used.

An input image or an output image can be accompanied by an image pickup condition, such as a focal length of a lens, an aperture value, and an object distance, and various correction information used to correct these images. When a correction process is performed for the captured image which is transmitted from an image pickup apparatus to an image processing apparatus, it is preferable for the captured image to be accompanied by an image pickup condition and information on correction, as mentioned above. As another method, the image pickup apparatus and the image processing apparatus may be directly or indirectly connected to each other to receive and transmit an image pickup condition and information on correction between them.

[Image Restoration Process]

Subsequently, an outline of an image restoration process will be described. The following Expression (1) is satisfied where g(x, y) is a captured image (deteriorated image), f(x, y) is an original image, and h(x, y) is a point spread function PSF, which is a Fourier pair of an optical transfer function OTF.

$$g(x,y)=h(x,y)*f(x,y) \quad (1)$$

In Expression (1), symbol * denotes a convolution (convolution integration, or convolution sum-product), and symbol (x, y) denotes coordinates on the captured image.

G(u, v) represented by Expression (2) represented by the product of each frequency is obtained by the Fourier transform of g(x, y) represented by Expression (1) to convert to a display format on a frequency surface.

$$G(u,v)=H(u,v) \cdot F(u,v) \quad (2)$$

In Expression (2), H is an OTF obtained by the Fourier transform of the PSF (h), G and F are functions obtained by the Fourier transform of the deteriorated image g and the original image f, respectively, and (u, v) is coordinates on a two-dimensional frequency surface, that is, a frequency.

Both sides of Expression (2) only have to be divided by the optical transfer function H as in the case of the following Expression (3) to obtain the original image f from the deteriorated image g.

$$G(u,v)/H(u,v)=F(u,v) \quad (3)$$

When the reverse Fourier transform is performed for F(u, v), that is, G(u, v)/H(u, v) to reconvert the frequency surface to a real surface, the original image f(x, y) can be obtained as a restored image.

A convolution process relative to an image on the real surface as the following Expression (4) also obtain the original image f(x,y) where R is a function obtained by the reverse Fourier transform of $H^{-1}$.

$$g(x,y)*R(x,y)=f(x,y) \quad (4)$$

In Expression (4), R(x, y) is called an "image restoration filter". If an image is a two-dimensional image, in general, an image restoration filter R is also a two-dimensional filter having a tap (cell) corresponding to each pixel of the image.

Generally, the larger tap number (the number of cells) of the image restoration filter R increases the restoration accuracy. Accordingly, a feasible tap number is set according to, for example, required image quality, image processing capability, aberration characteristics. Since the image restoration filter R needs to reflect at least aberration, it is different from a conventional edge-enhanced filter (a high-pass filter) with about three taps in horizontal and vertical directions. Since the image restoration filter R is set based on the optical transfer function OTF, both of deteriorations of an amplitude component and a phase component can be highly accurately corrected.

Since an actual image contains a noise component, using the image restoration filter R created by a perfect inverse of the optical transfer function OTF restores the deterioration image and significantly amplifies the noise component. The reason for this is that an MTF (amplitude component) of the optical system is boosted such that its value returns to one over all frequencies from a state in which a noise amplitude is added to the amplitude component of the image. The value of the MTF, which is an amplitude deterioration of the optical system, returns to one, but the power spectral of the noise is boosted at the same time. As a result, the noise is inevitably amplified depending on the degree of boosting of the MTF (restoration gain).

Thus, if an original image contains the noise, a satisfactory restored image as an image intended to be appreciated cannot be obtained. This is represented by the following Expressions (5-1) and (5-2).

$$G(u,v)=H(u,v)\cdot F(u,v)+N(u,v) \quad (5\text{-}1)$$

$$G(u,v)/H(u,v)=F(u,v)+N(u,v)/H(u,v) \quad (5\text{-}2)$$

In Expressions (5-1) and (5-2), N is a noise component.

With regard to an image containing the noise component, the method of controlling the degree of its restoration according to the strength ratio SNR of an image signal and a noise signal, as in the case of the Wiener filter represented by the following Expression (6), is known.

$$M(u,v) = \frac{1}{H(u,v)} \frac{|H(u,v)|^2}{|H(u,v)|^2 + SNR^2} \quad (6)$$

In Expression (6), M(u, v) is frequency characteristics of the Wiener filter, and |H(u,v)| is an absolute value (MTF) of the optical transfer function OTF. In this method, a restoration gain (degree of restoration) is set, for each frequency, in proportion to a value of the MTF. Generally, the MTF of the image pickup optical system has higher values in low frequencies and lower values in high frequencies. In this method, substantially, the restoration gain in the high frequencies of the image is reduced.

Figure 5:
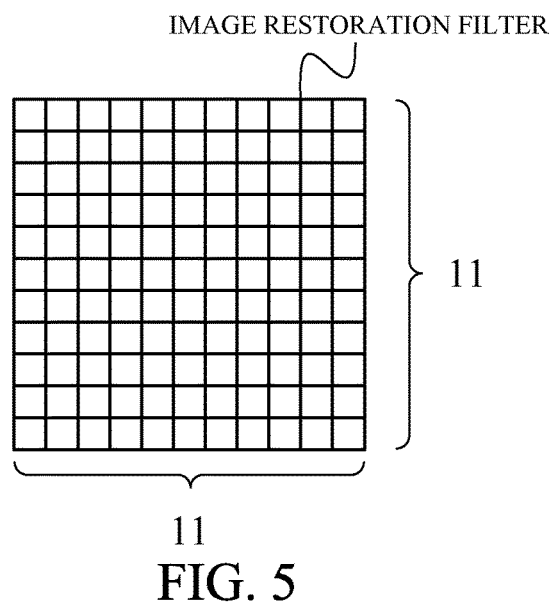
FIG. 5 is an explanatory diagram of an image restoration filter.
Figure 6:
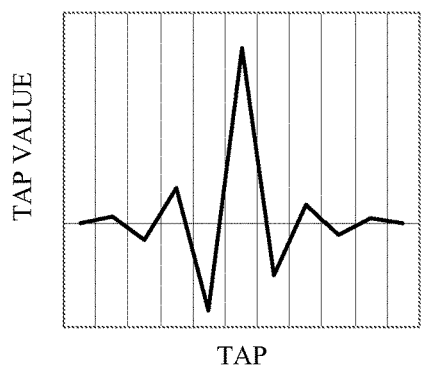
FIG. 6 is an explanatory diagram of an image restoration filter.

Subsequently, referring to FIGS. 5 and 6, the image restoration filter will be described. The tap number of the image restoration filter depends on aberration characteristics of the image pickup optical system and on required restoration accuracy. The image restoration filter illustrated in FIG. 5 as an example is a two-dimensional filter having an 11×11 tap. In FIG. 5, while a value in each tap is omitted, one cross section of this image restoration filter is illustrated in FIG. 6. A distribution of values (coefficient values) of each tap of the image restoration filter ideally has a function of reconstructing a signal value (PSF) spatially spread due to the aberration as an original point.

Each tap of the image restoration filter is subjected to a convolution process (convolution integration/convolution sum-product) in an image restoration processing step depending on each pixel of the image. In the convolution process, the predetermined pixels are accorded with the center of the image restoration filter to improve the signal values of the pixels. Then, for the image and its corresponding pixel values of the image restoration filter, each signal value of the image is multiplied by each coefficient value of the image restoration filter. Finally, the resulting total sum replaces the signal value of a center pixel.

Figures 7A, 7B:
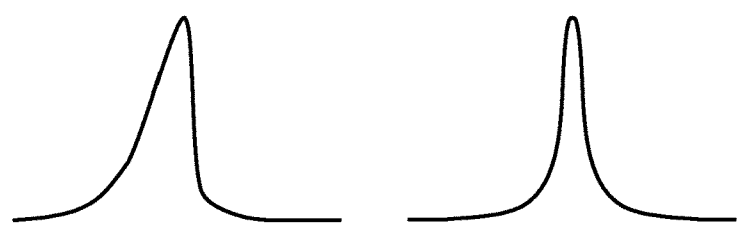
FIGS. 7A and 7B are explanatory diagrams of a point spread function.

Subsequently, referring to FIGS. 7A, 7B, 8A and 8B, image restoration characteristics observed in a real space and a frequency space will be described. FIGS. 7A and 7B are explanatory diagrams of the point spread function PSF. FIG. 7A illustrates the point spread function PSF before the image restoration process, and FIG. 7B illustrates the point spread function PSF after the image restoration process.

Figure 8A:
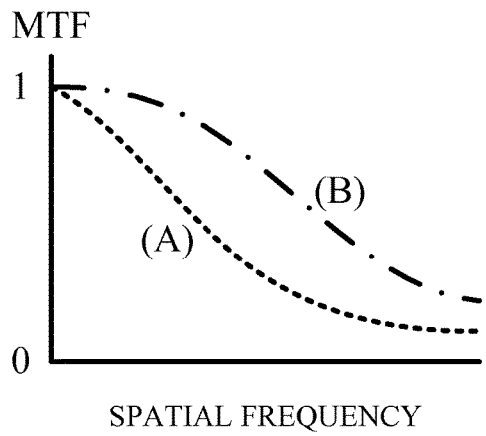
FIGS. 8A and 8B are explanatory diagrams of an amplitude component and a phase component of an optical transfer function.
Figure 8B:
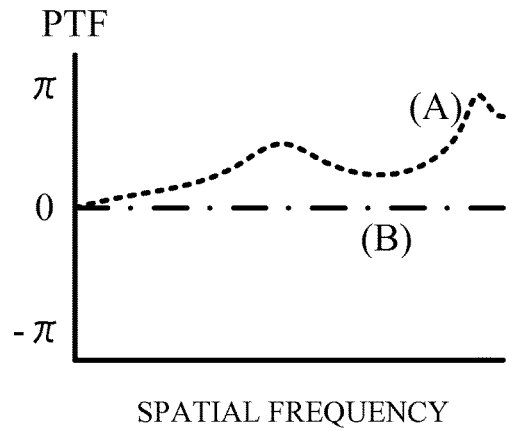

FIGS. 8A and 8B are explanatory diagrams of an amplitude component MTF (FIG. 8A) and a phase component (8B) of the optical transfer function OTF. In FIG. 8A, a dashed line (A) denotes the MTF before the image restoration process, and a dashed-dotted line (B) denotes the MTF after the image restoration process. Similarly, in FIG. 8B, a dashed line (A) denotes the PTF before the image restoration process, and a dashed-dotted line (B) denotes the PTF after the image restoration process. As illustrated in FIG. 7A, the point spread function PSF before the image restoration process asymmetrically spreads. Because of this asymmetry, the phase component PTF has a value nonlinear to the frequency. The image restoration process amplitudes the amplitude component MTF and corrects the phase component PTF to be zero, and thus the point spread function PSF after the image restoration process has symmetrical and sharp shape.

As described above, the image restoration filter can be obtained by the reverse Fourier transform of a function designed based on an inverse function of the optical transfer function OTF of the image pickup optical system. The image restoration filter used in this embodiment can be changed as appropriate, and the Wiener filter described above, for example, can be used. When the Wiener filter is used, the reverse Fourier transform of the Expression (6) allows creation of an image restoration filter in a real space which is actually convoluted with an image. In addition, the optical transfer function OTF varies depending on an image height of the image pickup optical system (a position in the image) even in one image pickup state. Accordingly, the image restoration filter is used depending on the image height.

First Embodiment

A camera system in this embodiment will be described by referring to FIG. 1. FIG. 1 is a block diagram illustrating a configuration of the camera system.

An image pickup optical system 101 images a light flux from an object (not illustrated) on an image pickup element 102, which includes a sensor such as a CCD (charge-coupled device) sensor and a CMOS (complementary metal-oxide semiconductor) sensor. The image pickup optical system 101 includes a variable magnification lens (not illustrated), a diaphragm 101a, and a focus lens 101b. The image pickup optical system 101 includes at least one plastic lens. Moving the variable magnification lens in an optical axis direction varies a focal length of the image pickup optical system 101. The diaphragm 101a varies an aperture diameter to adjust light quantity received by the image pickup element 102. A position in the optical axis direction of the focus lens 101b is controlled by an autofocus (AF) mechanism (not illustrated) and a manual focus mechanism to focus according to an object distance. The image pickup element 102 may be driven instead of the focus lens 101b to perform a focusing process. Detail relating to a focusing process will be described below.

The image pickup element 102 converts an object image formed on the image pickup element 102 to electric signals. Analog output signals from the image pickup element 102 is converted to digital image pickup signals by an A/D convertor 103, and the digital image pickup signals are input to an image processing unit 104.

The image processing unit (image processor) 104, which is constituted by a computer for an image processing, executes a process according to a computer program. The image processing unit 104 includes an image generating unit 104a, which performs various processes relative to the input digital image pickup signals to generate a color input image. The image processing unit 104 also includes an image restoration/distortion correction unit 104b, which performs an image restoration process and a geometric conversion process (distortion correction process) relative to the color input image. An output image after processing is stored by an image recording medium 109, or is displayed by a display 105, which includes a LCD (liquid crystal display). The configuration from the image pickup element 102 to the image generating unit 104a corresponds to an image pickup system.

An image pickup state detector 107 detects information regarding a state (hereinafter referred to as "image pickup state") of the image pickup optical system 101 when the focus lens 101b performs focus adjustment of the object. For example, the image pickup state is a focus length (zoom position) of the image pickup optical system 101, an aperture diameter of a diaphragm (aperture value, F number), and a focus lens position (object distance). The image pickup state detector 107 may acquire image pickup state information from a system controller 110 or may acquire it from an image pickup optical system controller 106, which controls the image pickup optical system 101.

An image pickup environmental detector 111 detects an image pickup environment when the focus lens 101b performs the focus adjustment of the object. The image pickup environment is atmospheric temperature and humidity during shooting. If the image pickup environmental detector 111 is attached to the image pickup optical system 101, internal temperature and internal humidity in the image pickup optical system 101 can also be used as the image pickup environment.

A memory 108 stores information regarding a focal plane correcting value to correct a focus position correcting to the image pickup state and the image pickup environment.

The system controller (controller) 110 acquires the information regarding a focal plane correcting value in the memory 108 based on the image pickup state information of the image pickup state detector 107 and image pickup environmental information of the image pickup environmental detector 111. The system controller 110 controls the image pickup optical system controller 106, drives the focus lens 101b to correct a focal plane, and performs photographing.

The image restoration/distortion correction unit 104b acquires the image pickup state information from the image pickup state detector 107 and the image pickup environmental information from the image pickup environmental detector 111. And, the image restoration/distortion correction unit 104b selects the image restoration filter according to the image pickup state and the image pickup environment from the memory 108 to perform the image restoration process relative to the input image. The image restoration/distortion correction unit 104b also selects a geometric conversion condition according to the image pickup state from the memory 108 to perform the geometric conversion process relative to the image after the image restoration process.

Figure 2:
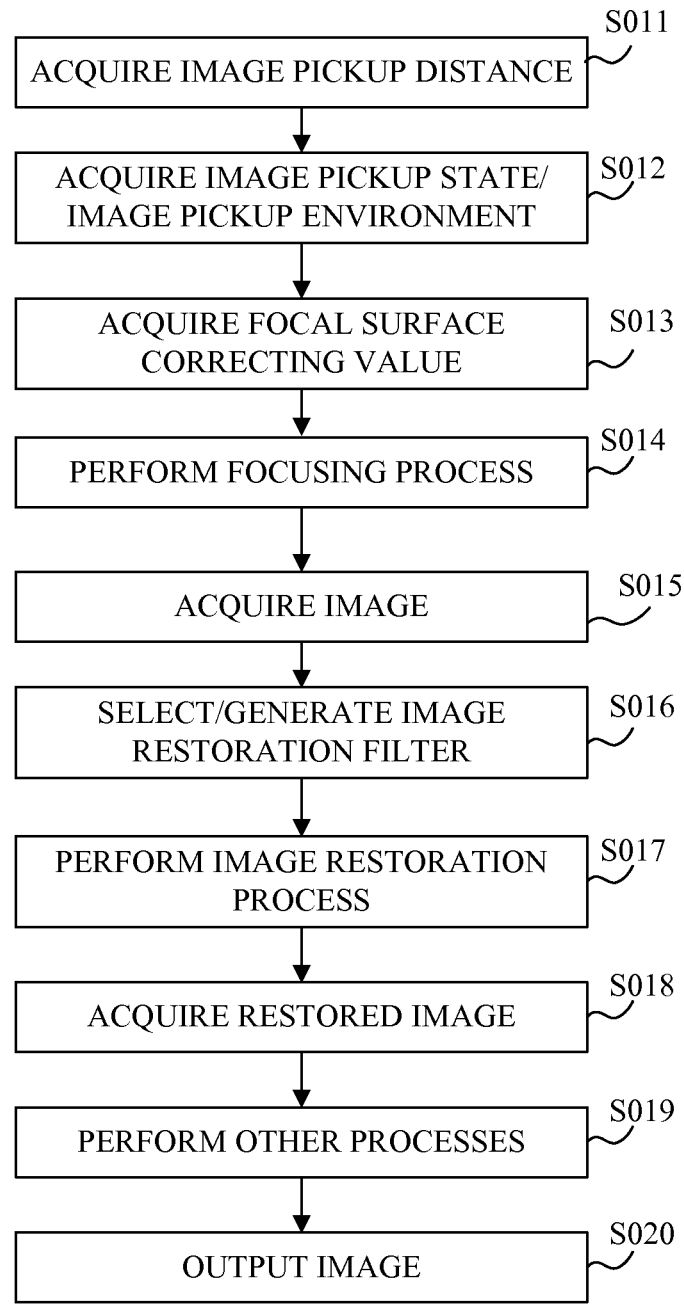
FIG. 2 is a flowchart of an image processing method in the first embodiment.

FIG. 2 is a flowchart of an image pickup processing method in this embodiment.

In step S011, an image pickup distance to focus on the object is detected.

In step S012, the image pickup state detector 107 detects the image pickup state information, and the image pickup environmental detector 111 detects the image pickup environmental information.

In step S013, the system controller 110 acquires the focal plane correcting value, which the memory 108 stores, based on the image pickup state information and the image pickup environmental information.

In step S014, a focusing process is performed. The focusing process will be described referring to FIGS. 3 and 4.

Figure 3:
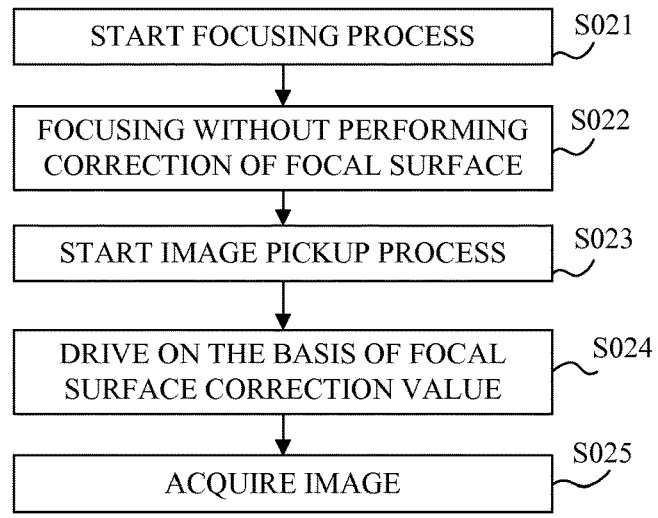
FIG. 3 is a flowchart of a focusing process of a single-lens reflex camera.

FIG. 3 is a flowchart of a focusing process of a single-lens reflex camera.

In step S021, a half depressing operation of a shutter button (not illustrated) starts the focusing process.

In step S022, the system controller 110 controls the image pickup optical system controller 106 without performing a correction of a focal plane, and drives the focus lens 101b to perform the focusing process. Performing the correction of the focal plane in this step causes a problem that the focal plane shifts from an object which a user focuses on, and the object observed by a finder is out of focus. Accordingly, the object is kept on focusing without performing the correction of the focal plane during finder observation In step S023, a full depressing operation starts an image pickup process.

In step S024, the correction of the focal plane is performed when a quick return mirror image moves not to observe the object by the finder. The focal lens 101b drives on the basis of the focal plane correcting value acquired at step S013 in FIG. 2. This procedure can solve the problem when observing by the finder. In a manual focus operation, the correction of the focal plane may be performed by changing to the autofocus operation during shooting without performing during finder observation.

In step S025, the image pickup element 102 acquires the image.

Figure 4:
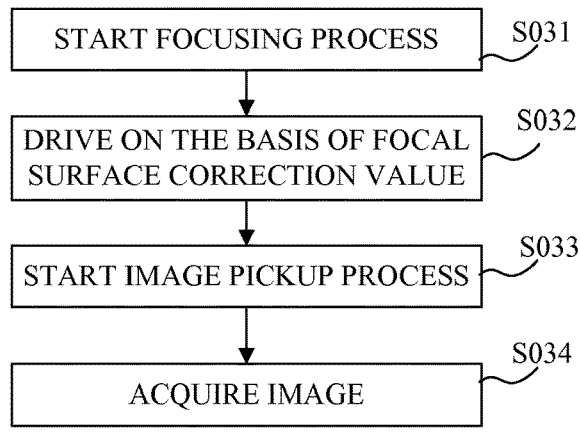
FIG. 4 is a flowchart of a focusing process of a camera utilizing an electronic viewfinder.

FIG. 4 is a flowchart of a focusing process of a camera utilizing an electronic viewfinder.

In step S031, a half depressing operation of the shutter button starts a focusing process.

In step S032, the focus lens 101b moves by combining amounts combining moving amounts based on the object information acquired at step S011 in FIG. 2 and moving amounts based on the focal plane correction value acquired at step S013 in FIG. 2.

Displaying the image, which is generated by performing the image restoration process relative to an image being out of focus, on the electronic viewfinder enables photographers not to recognize focus shift.

In step S033, the full depressing operation of the shutter button starts an image pickup process.

In step S034, the image pickup element 102 acquires the image.

Figure 9:
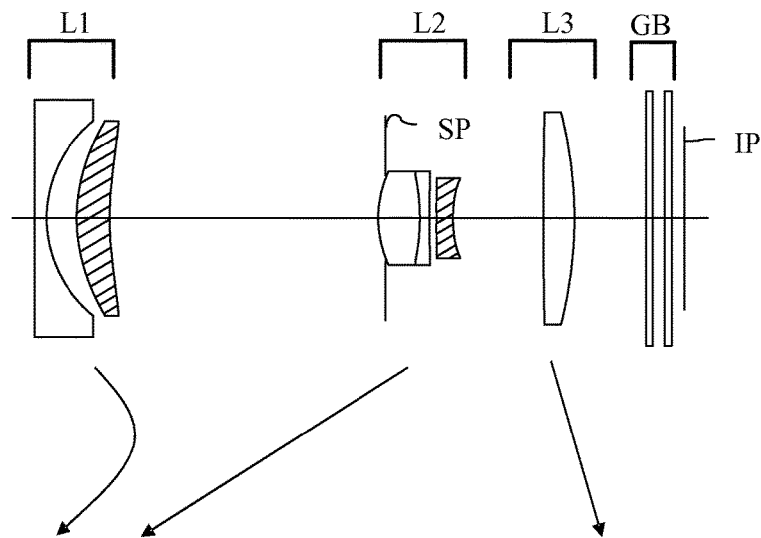
FIG. 9 is a sectional view of an image pickup optical system at a wide angle end in a numerical example 1.
Figure 10:
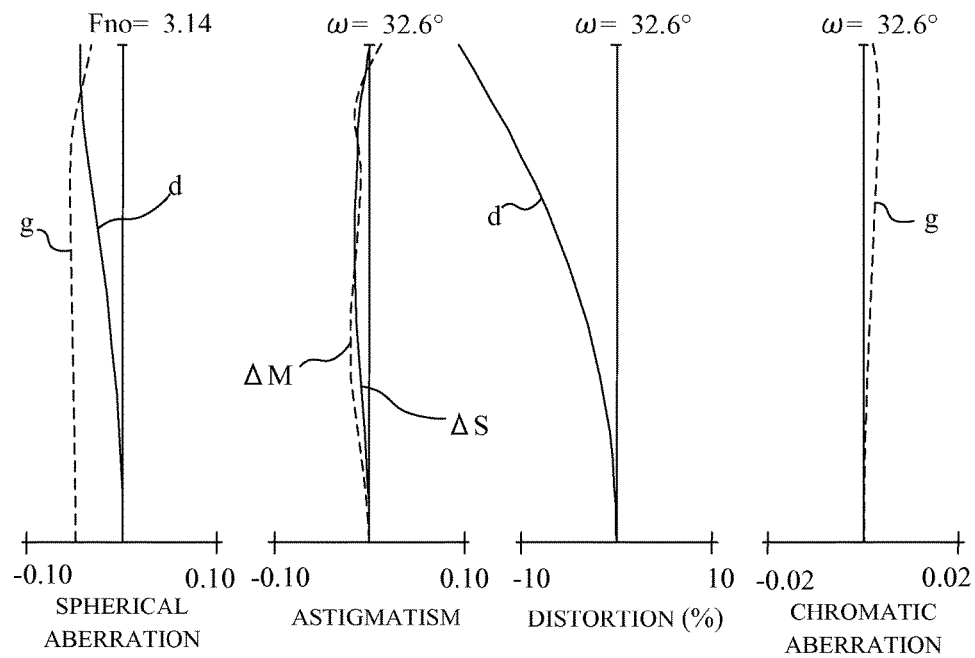
FIG. 10 is a longitudinal aberration diagram of the image pickup optical system at the wide angle end in the numerical example 1.
Figure 11:
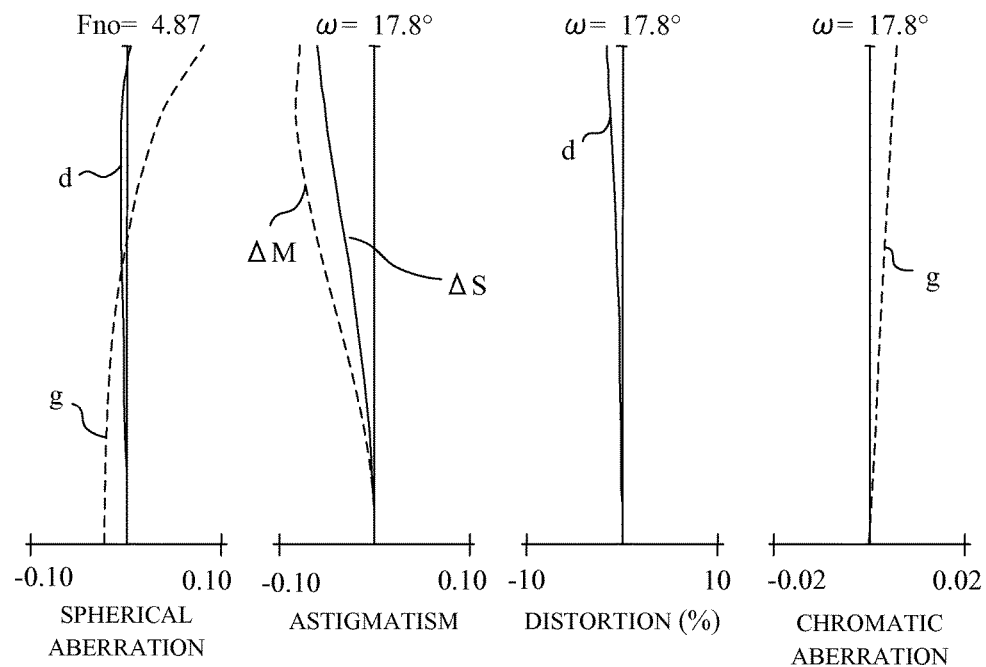
FIG. 11 is a longitudinal aberration diagram of the image pickup optical system at an intermediate focal length in the numerical example 1.
Figure 12:
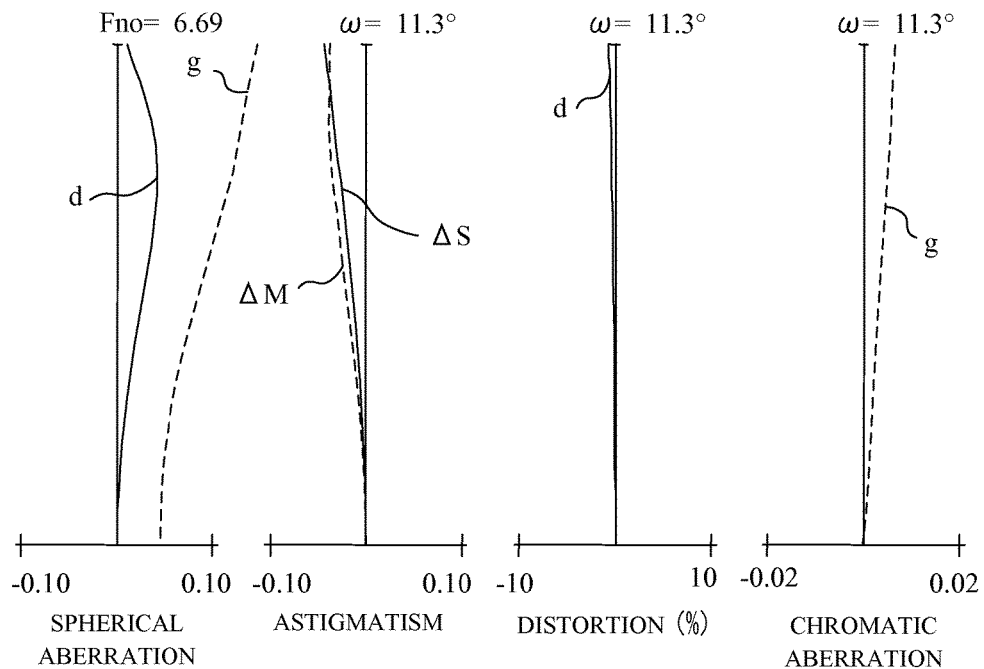
FIG. 12 is a longitudinal aberration diagram of the image pickup optical system at a telephoto end in the numerical example 1.

Here, detail relating to a process, which performs a focus correction on the basis of the image pickup state information and the image pickup environmental information, will be described below referring to a numerical example 1. The image pickup optical system in the numerical example 1 is a zoom lens having a zoom ratio of 3.72. FIG. 9 is a sectional view of the image pickup optical system at a wide angle end. FIG. 10 is a longitudinal aberration diagram of the image pickup optical system at the wide angle end. FIG. 11 is a longitudinal aberration diagram of the image pickup optical system at an intermediate focal length. FIG. 12 is a longitudinal aberration diagram of the image pickup optical system at a telephoto end.

The image pickup optical system includes, in order from an object side, a first lens unit L1 having a negative refractive power, a second lens unit L2 having a positive refractive power, a third lens unit L3 having a positive refractive power, and a glass block GB. Additionally, plastic lenses are used for a lens, which is indicated by oblique lines, in the first lens unit L1 and a lens, which is indicated by oblique lines, in the second lens unit L2 to decrease in size and cost of the image pickup optical system. Changes of environment, such as atmospheric temperature and humidity, causes the plastic lenses to change a refractive index and a shape compared to lenses constituted by glass. Thus, the changes of environment generate focus shift and aberration variations, and the captured image deteriorates. Especially, the plastic lenses having larger refractive power prominently degrade the captured image.

In the numerical example 1, ri represents a curvature radius of an i-th lens surface in order from the object side, and di represents lens thickness or air interval of the i-th lens surface, ndi and vdi respectively represent a refractive index and an Abbe number of a material of an i-th lens for the d-line. Moreover, the aspheric shape is expressed by the following expression where R represents a curvature radius of a center part of a lens surface, X represents a position (coordinate) in the optical axis direction, Y represents a position (coordinate) in a direction orthogonal to the optical axis, K represents a conic constant, and Ai (i=1, 2, 3, . . . ) represents aspheric coefficient:

$$X = (1/R)Y2$$

$$1 + \{1 - (K+1)(Y/R)2\}^{1/2} + A4Y4 + A6Y6 + A8Y8 + A10Y10 + \ldots$$

Numerical Example 1

Unit mm

Surface Data

| Surface No. | r | d | nd | vd | Effective Diameter |
|---|---|---|---|---|---|
| 1 | −1805.122 | 0.50 | 1.72000 | 50.2 | 9.33 |
| 2 | 5.269 | 1.30 | | | 7.64 |
| 3* | 7.292 | 1.40 | 1.63550 | 23.9 | 7.65 |
| 4* | 15.124 | (Variable) | | | 7.36 |
| 5 (Diaphragm) | ∞ | −0.30 | | | 3.67 |
| 6 | 4.706 | 1.77 | 1.88300 | 40.8 | 3.69 |
| 7 | −8.802 | 0.40 | 1.80809 | 22.8 | 3.36 |
| 8 | 45.507 | 0.30 | | | 3.18 |
| 9* | −250.351 | 0.70 | 1.60737 | 27.0 | 3.15 |
| 10* | 6.460 | (Variable) | | | 3.05 |
| 11 | 197.335 | 1.32 | 1.69680 | 55.5 | 8.21 |
| 12 | −18.000 | (Variable) | | | 8.34 |
| 13 | ∞ | 0.30 | 1.51633 | 64.1 | 10.00 |
| 14 | ∞ | 0.50 | | | 10.00 |
| 15 | ∞ | 0.30 | 1.51633 | 64.1 | 10.00 |
| 16 | ∞ | (Variable) | | | 10.00 |
| Image Plane | ∞ | | | | |

Aspheric Surface Data

3rd surface

K = 7.38972e−001   A4 = −2.53332e−004   A6 = −3.26818e−005
A8 = 4.11113e−007

4th surface

K = −1.71328e+000   A4 = −2.42496e−004   A6 = −3.15381e−005
A8 = 5.90158e−007

9th surface

K = 0.00000e+000   A4 = 4.76613e−003   A6 = −5.53855e−004

10th surface

K = 3.03527e−001   A4 = 1.03811e−002   A6 = −3.70138e−005
A8 = −1.41210e−005

Various Data
Zoom Ratio 3.72

| | Wide | Intermediate | Tele |
|---|---|---|---|
| Focal Length | 5.21 | 12.10 | 19.38 |
| F-number | 3.14 | 4.87 | 6.69 |
| Angle of View | 32.60 | 17.76 | 11.31 |
| Image Height | 3.33 | 3.88 | 3.88 |
| Entire Lens Length | 27.58 | 25.06 | 28.75 |
| BF | 0.53 | 0.53 | 0.53 |
| d4 | 11.70 | 3.06 | 0.58 |
| d10 | 3.83 | 10.42 | 16.97 |
| d12 | 3.04 | 2.56 | 2.18 |
| d16 | 0.53 | 0.53 | 0.53 |
| Entrance Pupil Position | 6.39 | 3.72 | 2.38 |
| Exit Pupil Position | −11.91 | −30.03 | −100.28 |
| Front Side Main Spot | 9.42 | 11.03 | 18.03 |
| Rear Side Main Spot | −4.68 | −11.57 | −18.85 |

Zoom Lens Unit Data

| Unit | Starting Surface | Focal Length | Lens Constitution Length |
|---|---|---|---|
| 1 | 1 | −11.75 | 3.20 |
| 2 | 5 | 8.47 | 2.87 |
| 3 | 11 | 23.73 | 1.32 |
| GB | 13 | ∞ | 1.10 |

| Unit | Front Side Main Spot | Rear Side Main Spot |
|---|---|---|
| 1 | −0.03 | −2.44 |
| 2 | −1.95 | −2.98 |
| 3 | 0.71 | −0.07 |
| GB | 0.45 | −0.45 |

Single Lens Data

| Lens | Starting Surface | Focal Length |
|---|---|---|
| 1 | 1 | −7.30 |
| 2 | 3 | 20.72 |
| 3 | 6 | 3.70 |
| 4 | 7 | −9.10 |
| 5 | 9 | −10.36 |
| 6 | 11 | 23.73 |
| 7 | 13 | 0.00 |
| 8 | 15 | 0.00 |

Conditional Expression Corresponding Table

|     |         | Numerical example 1 | |
| --- | --- | --- | --- |
|     |         | G2    | G3    |
| (1) | \|fp\|/ft | 1.07  | 0.53  |
| (2) | \|Δp/Δz\| | 0.040 | 0.058 |

Table 1 shows moving amounts of focus and variations of meridional curvature of field based variations of a refractive index of a plastic lens used for the lens G2 in the first lens unit L1 and the lens G5 in the second lens unit L2 according to variations of atmospheric temperature. Numeric data in Table 1 is calculated under the assumption that atmospheric temperature varies from 20° C. to 40° C. Variations of meridional curvature of field are variations at a position of 70% relative to maximum image height of a sensor.

TABLE 1

|    |                | Moving amounts of focus | Curvature of field variation |
| --- | --- | --- | --- |
| G2 | Wide angle end | 0.007  | 0.004  |
|    | Telephoto end  | 0.091  | 0.004  |
| G5 | Wide angle end | −0.030 | −0.006 |
|    | Telephoto end  | −0.148 | −0.009 | unit: mm

Figure 13:
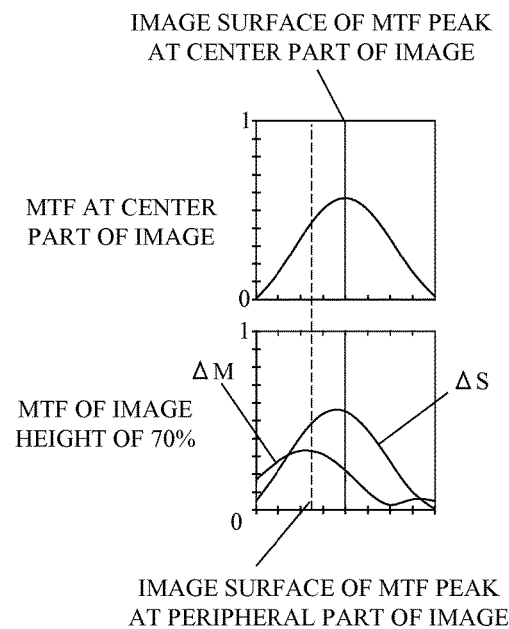
FIG. 13 is an exemplary diagram of an image plane correction process.

Since the plastic lens varies the refractive index according to variations of atmospheric temperature, moving amounts of focus and variations of curvature of field thereof widely varies. Especially, moving amounts of focus relative to variations of curvature of field widely varies at the telephoto end, and as a result, curvature of field significantly occurs. FIG. 13 illustrates an example of the MTF in a state where curvature of field significantly occurs according to variations of environment. In this state, for example, focusing the object at the center of the image dominantly deteriorates image quality at a peripheral part of the image.

Conventional image restoration process has generated an image restoration filter under the assumption that atmospheric temperature and humidity are constant without considering variations of environment during shooting. However, the image pickup optical system using the plastic lens, which generates curvature of field according to variations of environment, differs from the conventional image restoration filter generated without considering variations of environment in optical characteristics, and thus cannot appropriately performs the image restoration process. Additionally, focusing on the object positioned at the center of the image in a state where curvature of field occurs according to variations of environment enormously reduces the MTF at the peripheral part of the image, and thus the image restoration process cannot be performed.

In this embodiment, the image pickup plane is positioned in an intermediate region between a peak position of an MTF of the image pickup optical system at a center of an image and a peak position of the MTF at a peripheral part of the image, by correcting amounts, which are based on the image pickup state information and the image pickup environmental information, and the captured image at the image pickup position is acquired. Then, performing the image restoration process at the position of the image pickup plane acquired by correcting the focal plane can reflect the optical characteristics according to variations of the environment.

In FIG. 13, focusing on the image at the center of the image deteriorates the image of the object because the focus correction process corrects the focal position to the intermediate region between the position of the MTF at the center part of the image and the position of the MTF at the peripheral part of the image. However, the image restoration filter enables the image deteriorated by the focus correction to be a high definition image. The focal position correction moves the image pickup plane on the peak position side of the MTF at the peripheral part of the image to reduce extremely deterioration by curvature of field. Moreover, utilizing the image restoration filter generated at the position of the image pickup plane can highly accurately perform the image restoration process.

Since the moving amounts of the focus and variations of curvature of field according to the image pickup conditions, such as the wide angle end and the telephoto end, when the environment is varied as illustrated in Table 1, the focus correction value is determined by the image pickup state and the image pickup environment. In a region where variations of curvature of field are small according to variations of the image pick up environment as the wide angle end, adjusting the focus correction may be omitted. This embodiment describes variations of the optical characteristics according to atmospheric temperature as the image pickup environment, but the image pickup environment also includes variations of the optical characteristics by humidity.

When the plastic lens is used, the following expression (7) may be satisfied where fp represents the focal length of the plastic lens and ft represents the focal length at the wide angle end of the entire lens system.

$$0.4 < |fp|/ft \tag{7}$$

The expression (7) represents a conditional expression regarding the refractive index of the plastic lens. When the refractive index of the plastic lens strengthens by exceeding the lower limit, curvature of field according to variations of atmospheric temperature environment excessively increases. Accordingly, if the focus correction is performed, the MTF at the peripheral part of the image extremely decreases, and thus the image restoration process cannot be performed.

Additionally, the following expression (8) may be satisfied where Δp represents moving amounts of focus relative to variations of the refractive index of the plastic lens at the telephoto end and Δz represents variations of the imaging surface relative to variations of the refractive index.

$$0.02 < |\Delta z \Delta p| \tag{8}$$

The expression (8) represents a conditional expression regarding moving amounts of focus and variations of curvature field of the plastic lens according to variations of environment. When the lower limit is exceeded, curvature of field according to variations of atmospheric temperature environment excessively increases. Accordingly, if the focus correction is performed, the MTF at the peripheral part of the image extremely decreases, and thus the image restoration process cannot be performed.

The embodiment describes deterioration of the image relative to variations of the image pickup environment using the plastic lens as an example, but the similar problem occurs during shooting using the lens including a glass in environment, such as a high-temperature and high-humidity environment and very low temperature environment. Additionally, the similar problem occurs in an optical system arranged near a lamp, which becomes high as the projection lens. Accordingly, the optical system using the plastic lens is not limited to an optical system in this embodiment. Moreover, since a resin material is used for a lens barrel holding the lens, arrangement of the optical system varies according to variations of environment and deterioration of optical characteristics occurs. Accordingly, cause of deterioration of the image according to variations of environment is not limited to a lens.

Next, in step S015, the image processing unit 104 acquires an image (hereinafter referred to as "input image") generated on the basis of the output signal from the image pickup element 102.

In step S016, the image processing unit 104 acquires the image pickup state information from the image pickup state detector 107. In this embodiment, the image pickup state information includes a zoom position, an aperture diameter of a diaphragm, and an object distance. The image processing unit 104 also acquires the image pickup environmental information from the image pickup environment detector 111. In this embodiment, the image pickup environmental information includes atmospheric temperature during shooting. The image processing unit 104 selects the image restoration filter corresponding to the image pickup state information and the image pickup environmental information from the memory 108. Additionally, the memory 108 may hold filters to correct image deterioration for every image pickup state and image pickup environment so that the image processing unit 104 generates the image restoration filter from filter coefficients. Moreover, the image processing unit 104 may hold the image restoration filters corresponding to the image pickup state information and the image pickup environmental information to select according to the image pickup state information and the image pickup environmental information.

In step S017, the image processing unit 104 performs the image restoration filter relative the input image acquired in step S015 utilizing the image restoration filter selected or generated in step S016.

In step S018, the image processing unit 104 acquires the image to which the image restoration process is performed.

In step S019, the image processing unit 104 performs other processes other than the image restoration process, which are necessary for image forming, relative to the image acquired in step S018 to acquire the output image. If the image after the correcting process is a mosaic image, a color interpolation process (demosaicing process) is performed as "the other processes". The other processes include an edge enhancement process, a shading correction (peripheral light correction), and a distortion aberration correction. Additionally, various image processes explained in this embodiment including the other processes may be performed in the above flowchart as necessary.

In step S020, the image processing unit 104 outputs the image acquired in step S019 to at least one of the display 105 and the image recording medium 109. Additionally, the image processing unit 104 may output the image acquired in step S019 to a recording part in the image processing unit 104 so that the recording part stores the output image data.

Desirable orders of each processing step and processes to be considered are explained, but the orders of the processing steps are not limited and may change according to restricting conditions in the process and requested image quality. Moreover, the process restoring only the phase component is performed in the correcting process in this embodiment, but the amplitude components may slightly change as mentioned above if noise amplification is within allowable ranges.

Additionally, the image processing unit 104 includes a calculator and a temporary storage part (buffer). Writing (storing) and reading of the image are performed for each step of the imaging process as necessary. The memory 108 may be used as the temporary storage part.

Second Embodiment

Figure 14:
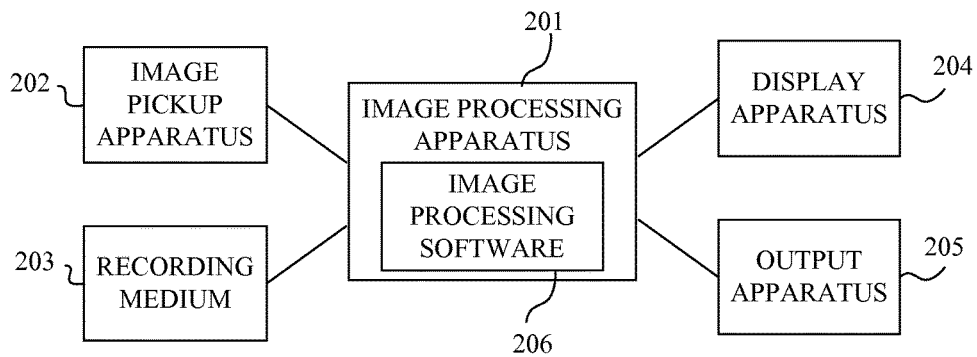
FIG. 14 is a block diagram illustrating a configuration of an image processing system in a second embodiment.

FIG. 14 is a block diagram of an image pickup processing system in this embodiment. An image processing apparatus 201 is constituted by a computer apparatus, and includes an image processing software (image processing program) 206 for executing the image processing method in the image pickup apparatus of first embodiment by the computer apparatus. For example, a camera, a microscope, an endoscope, and a scanner are considered as an image pickup 202. A recording medium 203, such as a semiconductor memory, a hard disk, and a server on a network, stores an image (image pickup data) generated by shooting. An output apparatus 205, for example, is a printer. The image processing apparatus 201 is connected to a display apparatus 204, and a user can perform an image processing operation through the display apparatus 204 to evaluate a corrected image.

The image processing software 206 includes a developing function and other image processing functions as necessary other than an image restoration process function (correcting function of phase deterioration components and amplitude deterioration components) and a recovery degree adjusting function.

Figure 15:
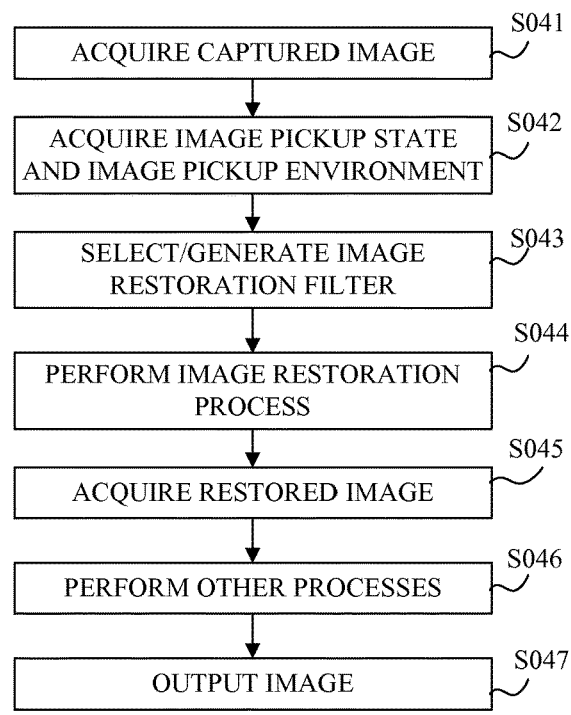
FIG. 15 is a flowchart of an image processing method in the second embodiment.

FIG. 15 is a flowchart of the image processing method in this embodiment.

In step S041, the image processing apparatus 201 acquires a captured image. The captured image includes image pickup state information and image pickup environmental information during shooting. The image processing apparatus 201 may acquire an image shot by the image pickup apparatus 202 and may acquire an image stored in the recording medium 203.

In step S042, the image processing apparatus 201 acquires the image pickup state information and the image pickup environmental information, which are recorded in the captured image.

In step S043, the image processing unit 201 selects an image restoration filter corresponding to the image pickup state information and the image pickup environmental information acquired in step S042 from the recording medium 203. The recording medium 203 may store optical information such as the OTF for each image pickup state and image pickup environment so that the image processing unit 104 generates the image restoration filter from the optical information.

In step S044, the image processing apparatus 201 performs the image restoration process relative to the captured image acquired in step S041 utilizing the image restoration filter selected or generated in step S043.

In step S045, the image processing apparatus 201 acquires the image to which the image restoration process is performed.

In step S046, the image processing apparatus 201 performs other image process other than the image restoration process relative to the image acquired in step S045.

In step S047, the image processing apparatus 201 outputs the image to which the image process is performed to at least one of the output apparatus 205, the image pickup apparatus 202, and the recording medium 203. Additionally, the image processing unit 201 may output the image to which the image process is performed to a recording part in the image processing apparatus 201 so that the recording part stores the output image data.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-178186, filed on Sep. 2, 2014, which is hereby incorporated by reference wherein in its entirety.

What is claimed is:

1. An image pickup apparatus comprising:
a controller configured to adjust a position of a focal plane of an image pickup optical system with respect to a position of an image pickup plane by a correction amount based on image pickup environmental information so that the image pickup plane is positioned in an intermediate region between a peak position of a modulation transfer function (MTF) of the image pickup optical system at a center of an image and a peak position of the modulation transfer function (MTF) at a peripheral part of the image;
an image pickup element configured to generate the image by converting an optical image formed on the image pickup plane to electric signals after the position of the focal plane is adjusted by the controller; and
an image processor configured to restore the image utilizing an image restoration filter obtained base on the image pickup environmental information and image pickup state information of the image pickup optical system,
wherein the image pickup environmental information includes at least one of atmospheric temperature, humidity, and internal temperature of the image pickup optical system during shooting.

2. The image pickup apparatus according to claim 1, wherein the correction amount includes determined on the basis of the image pickup environmental information and the image pickup state information.

3. The image pickup apparatus according to claim 1, wherein the image pickup state information is at least one of a focal length, an aperture diameter of a diaphragm, and an object distance.

4. The image pickup apparatus according to claim 1, wherein the image restoration filter is generated based on optical information on the position of the focal plane.

5. The image pickup apparatus according to claim 1, wherein the controller adjusts the position of the focal plane on the basis of the correction amount after focusing on an object.

6. The image pickup apparatus according to claim 1, wherein the controller adjusts the position of the focal plane on the basis of the correction amount simultaneously with focusing on an object.

7. A camera system comprising:
an image pickup optical system;
a controller configured to adjust a position of a focal plane of the image pickup optical system with respect to a position of an image pickup plane by a correction amount based on image pickup environmental information so that the image pickup plane is positioned in an intermediate region between a peak position of a modulation transfer function (MTF) of the image pickup optical system at a center of an image and a peak position of the modulation transfer function (MTF) at a peripheral part of the image;
an image pickup element configured to generate the image by converting an optical image formed on the image pickup plane to electric signals after the position of the focal plane is adjusted by the controller; and
an image processor configured to restore the image utilizing an image restoration filter obtained base on the image pickup environmental information and image pickup state information of the image pickup optical system,
wherein the image pickup environmental information includes at least one of atmospheric temperature, humidity, and internal temperature of the image pickup optical system during shooting.

8. The camera system according to claim 7, wherein the image pickup optical system includes at least one plastic lens.

9. An image processing apparatus comprising:
a computer configured to:
acquire an image captured by an image pickup apparatus by adjusting a position of a focal plane of the image pickup optical system of the image pickup apparatus with respect to a position of an image pickup plane by a correction amount based on image pickup environmental information so that the image pickup plane is positioned in an intermediate region between a peak position of a modulation transfer function (MTF) of the image pickup optical system at a center of the image and a peak position of the modulation transfer function (MTF) at a peripheral part of the image,
acquire an image restoration filter corresponding to the image pickup environmental information and image pickup state information; and
restore the image utilizing the image restoration filter,
wherein the image pickup environmental information includes at least one of atmospheric temperature, humidity, and internal temperature of the image pickup optical system during shooting.

10. A non-transitory computer-readable storage medium storing a program for causing a processor to execute a method comprising the steps of:
acquiring an image captured by an image pickup apparatus by adjusting a position of a focal plane of an image pickup optical system with respect to a position of an image pickup plane by a correction amount based on image pickup environmental information so that the image pickup plane is positioned in an intermediate region between a peak position of a modulation transfer function (MTF) of the image pickup optical system at a center of the image and a peak position of the modulation transfer function (MTF) at a peripheral part of the image;
acquiring an image restoration filter corresponding to the image pickup environmental information and image pickup state information; and
restoring the image utilizing the image restoration filter,
wherein the image pickup environmental information includes at least one of atmospheric temperature, humidity, and internal temperature of the image pickup optical system during shooting.

* * * * *